United States Patent [19]

Merritt et al.

[11] Patent Number: 5,747,968
[45] Date of Patent: May 5, 1998

[54] LITHIUM POLYMER BATTERY CHARGER APPARATUS

[75] Inventors: Lauren V. Merritt, Sunnyvale; Vincent L. Teofilo, Los Gatos; Roger Paul Hollandsworth, Boulder Creek; Zaid B. Rodriguez, Sunnyvale; Jack G. Lovgren, Milpitas, all of Calif.

[73] Assignee: Lockheed Martin Corp. Missiles & Space, Sunnyvale, Calif.

[21] Appl. No.: 584,798

[22] Filed: Jan. 11, 1996

[51] Int. Cl.[6] ........................................ H02J 7/00
[52] U.S. Cl. .............................. 320/119; 320/DIG. 29
[58] Field of Search .................... 320/15, 16, 17, 320/56, 18, 39, 122, 120, 121, 119, DIG. 29, DIG. 28

[56] References Cited

U.S. PATENT DOCUMENTS

| 4,079,303 | 3/1978 | Cox .................................. 320/17 |
| 4,084,124 | 4/1978 | Kaputska ...................... 320/15 X |
| 4,614,905 | 9/1986 | Petersson et al. ............. 320/39 X |
| 4,725,784 | 2/1988 | Peled et al. ..................... 324/427 |
| 4,736,150 | 4/1988 | Wagner ............................ 320/21 |
| 4,770,954 | 9/1988 | Noordenbos ....................... 429/9 |
| 4,831,595 | 5/1989 | Bone ............................ 365/229 |
| 5,028,860 | 7/1991 | Amano ........................... 320/23 |
| 5,070,427 | 12/1991 | Bush ............................. 361/104 |
| 5,119,009 | 6/1992 | McCaleb et al. ................ 320/13 |
| 5,168,206 | 12/1992 | Jones ............................. 320/31 |
| 5,254,930 | 10/1993 | Daly ............................. 320/119 |
| 5,302,902 | 4/1994 | Groehl ........................... 324/434 |
| 5,412,305 | 5/1995 | Jeanneret ....................... 320/17 |
| 5,646,504 | 7/1997 | Feldstein ...................... 320/119 |
| 5,659,237 | 8/1997 | Divan et al. ................... 320/119 |

Primary Examiner—Edward Tso
Assistant Examiner—K. Shin
Attorney, Agent, or Firm—Feix & Feix

[57] ABSTRACT

Lithium polymer battery charger apparatus for charging a plurality of equal charge point lithium polymer battery cells prevent overcharging of any cell, whether the cells are arranged in a series stack or are arranged in parallel. When the cells are connected in a series stack, a power supply is connected to the series stack to apply a charge current to the series stack. The state of charge of each cell in the stack is monitored. Information that the state of charge of any cell is approaching full charge is used to control the charge current and to prevent overcharging of any cell.

4 Claims, 5 Drawing Sheets

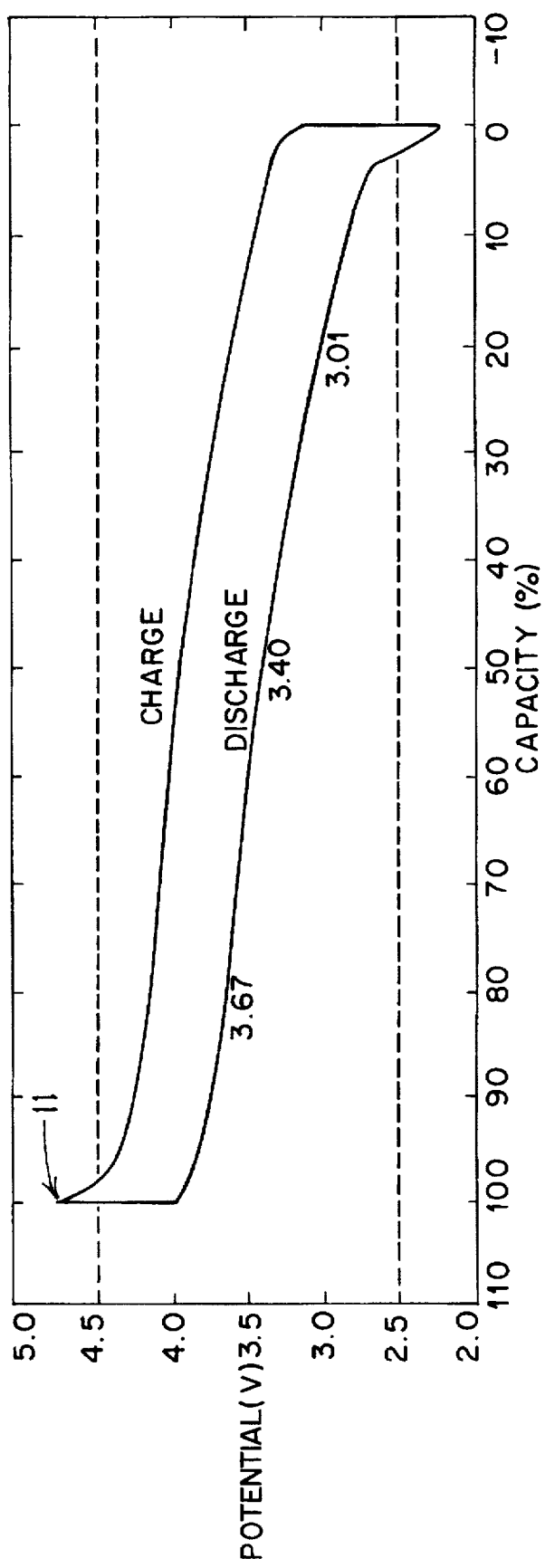
FIG_1

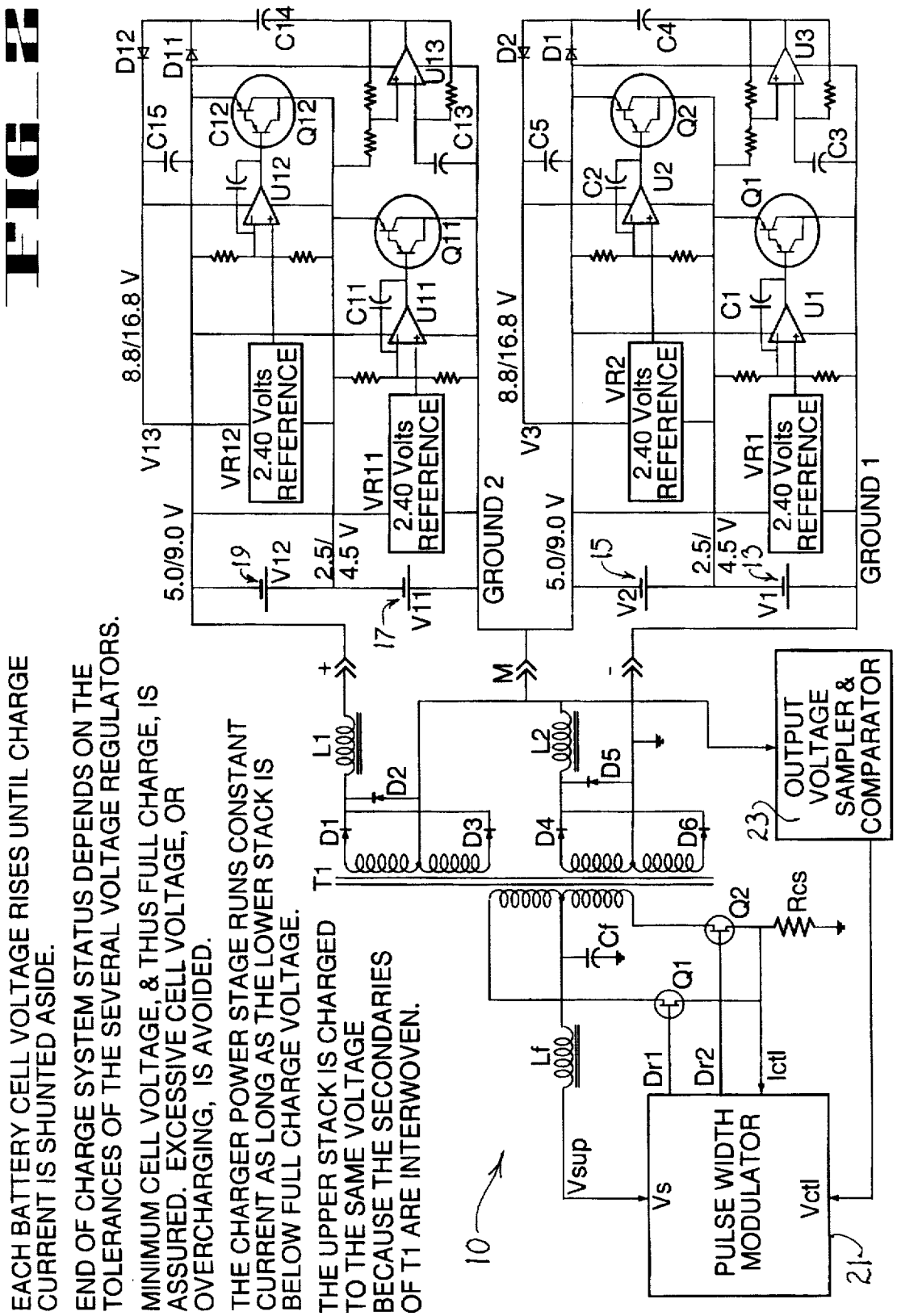

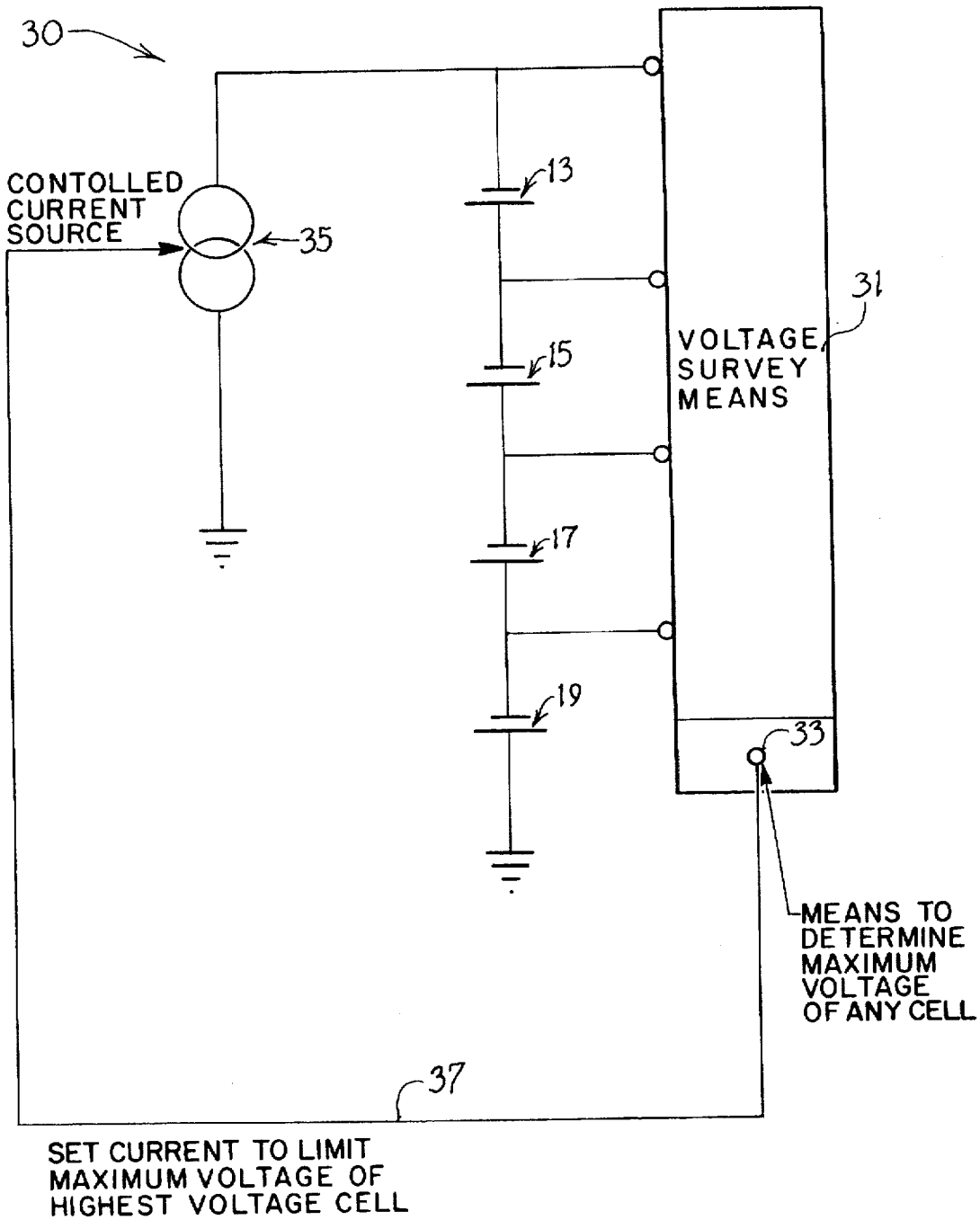

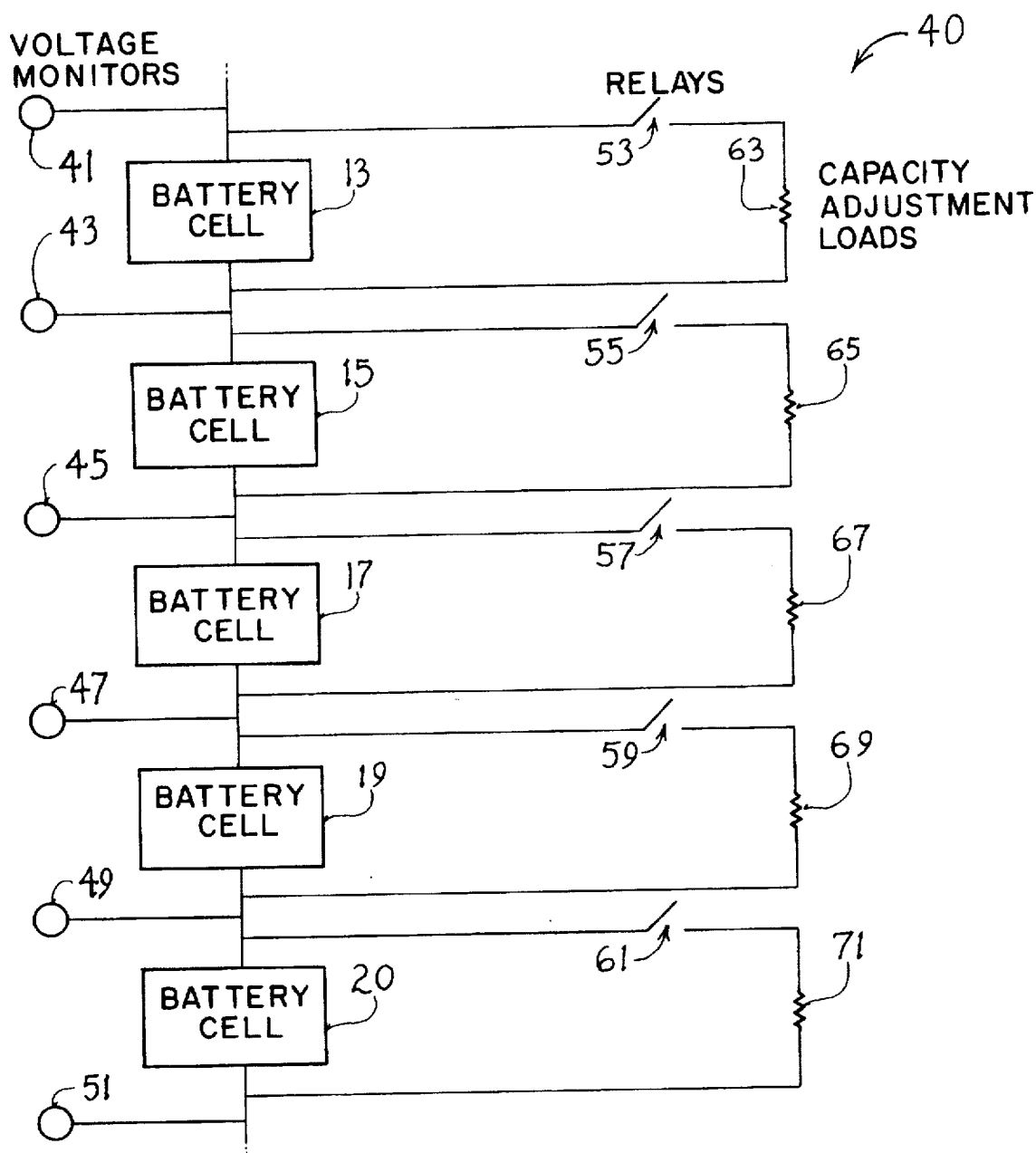
FIG_4
SAMPLE ALGORITHM:
CALCULATE: $\frac{EOC+EOD}{2}$ FOR EACH CELL
FIND CELL WITH HIGHEST CALCULATED VALUE
IF HIGHEST CELL ALSO HAS LOWEST EOD, DO NOTHING
ELSE, APPLY LOAD TO HIGHEST CELL FOR 15 MINUTES DURING NEXT CHARGE PERIOD

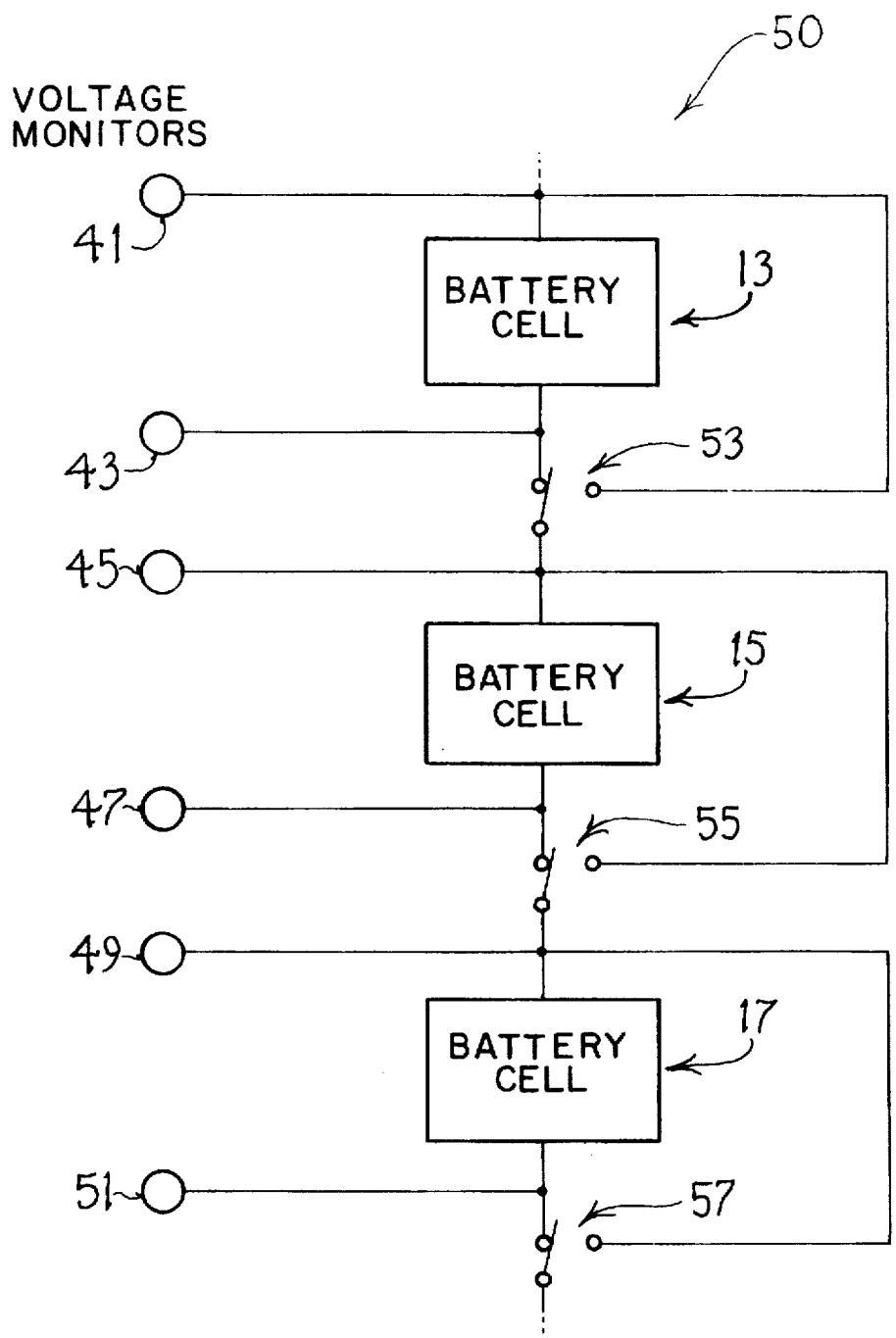

LITHIUM POLYMER BATTERY CHARGER APPARATUS

BACKGROUND OF THE INVENTION

This invention relates to lithium polymer battery charger apparatus.

This invention relates particularly to lithium polymer battery charger apparatus which prevent overcharging of any cell, whether the cells are arranged in a series stack or are arranged in parallel.

Lithium polymer battery cells are unforgiving of overcharge.

An overcharged lead acid battery will electrolyze some easily replaced water, and nickel-cadmium or metal-hydride batteries have voltages which stop rising at full charge; but the voltage of the lithium polymer battery cell continues to rise even while being overcharged.

The voltage of a lithium polymer battery rises quite distinctly at the end of charge.

For a lithium polymer battery having a fully charged voltage of as much as 4.5 volts, the voltage can rise to a voltage of about 4.7 volts.

What is unique in the lithium polymer battery cell art is that lithium polymer battery cells will not stand such overcharging. The overcharging must be avoided. Overcharging damages the battery cell seriously. There is no liquid to vaporize (as there is in a liquid acid battery, for example). Lithium polymer batteries work on the idea that lithium ions are embedded in a solid polymer. The lithium polymer battery cell is a solid battery. Overcharging can be visualized as depleting all of the lithium ions off of the plate. Breaking connection by overcharging results in a condition in which there is no way to re-establish the connection.

It is essential to avoid overcharging of a lithium polymer battery cell.

SUMMARY OF THE INVENTION

The lithium polymer battery charger apparatus of the present invention prevent overcharging of any cell, whether the cells are arranged in a series stack or are arranged in parallel.

In one embodiment of the present invention, a plurality of equal charge point lithium polymer battery cells are connected in a series stack. A power supply is connected to the series stack. The power supply applies a charge current through the series stack. The state of charge of each cell in the stack is monitored. The monitoring detects when the state of charge in any cell is approaching full charge. The charge current to each cell is controlled in response to the detecting of the state of charge to prevent overcharging of any cell.

In one embodiment of the present invention, the controlling of the charge current includes discontinuing the charge current to the series stack when any one cell reaches full charge.

In another embodiment of the present invention, the controlling of the charge current includes reducing the charge current to a trickle charge to the series stack when any one cell reaches full charge.

In several embodiments of the invention, the detecting of information that a particular lithium polymer battery cell is nearing full charge is used to shunt sufficient current around that cell to avoid overcharging that cell and to continue shunting around that cell until all of the cells have been fully charged. The shunting around a particular cell is done, in some embodiments of the present invention, in an analog transition in which the amount of shunted current is increased as the cell gets nearer to a fully charged condition. The shunting is done, in some other embodiments of the present invention, in a digital transition in which a relay is energized to shunt a fixed amount of current either when the cell reaches a fully charged condition or for a predetermined period of time during the charging cycle before the cell reaches the fully charged condition.

A single power supply may be used for charging a single series stack of cells or, in accordance with other embodiments of the present invention, multiple power supplies may be used for supplying multiple charge currents with a separate, series stack of cells connected to each power supply.

In one embodiment of the present invention, the multiple power supplies comprise multiple, equally matched, secondary windings of a transformer.

In some embodiments of the present invention, the charge current is constant current.

In other embodiments of the present invention, the charge current is varied during the charging operation.

In some embodiments of the present invention, the charging history of each cell is determined and the charge current to the cell is varied in dependence on the charging history and/or detection of the state of charge of the individual cell.

In one specific embodiment of the present invention, a plurality of equal charge point lithium polymer battery cells are charged by using a transformer having one primary winding and a plurality of equally matched secondary windings. Each secondary winding is connected to at least one lithium polymer battery cell. The voltage on the primary winding is controlled to produce a voltage in each secondary winding which is effective to bring each lithium polymer battery cell to a fully charged condition.

In one specific embodiment of the invention, only one lithium polymer battery cell is connected to a secondary winding. The maximum voltage on the primary winding is limited to that which will produce a voltage on each secondary winding corresponding to the voltage needed to bring the lithium polymer battery cells to the fully charged condition, and no additional monitoring circuitry is needed to avoid overcharging of the lithium polymer battery cells.

In other embodiments of the invention, a plurality of cells are connected in series with a particular secondary winding; and, in that event, each cell is instrumented to detect when the cell is nearing full charge. Sufficient current is then shunted around that cell to avoid overcharging that cell, and the shunting is continued until all of the cells in the series stack have been fully charged. The shunting is done in an analog transition or in a digital transition.

Apparatus which incorporate the features described above and which are effective to function as described above constitute further, specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a graph showing the charge and discharge characteristics of a lithium polymer battery with the voltage plotted as the vertical coordinate and with the percent capacity of charge plotted as the horizontal coordinate. FIG. 1 shows that a lithium polymer battery cell having a fully discharged voltage of 2.0 to 2.5 volts and a fully charged voltage of 4.0 to 4.5 volts depending upon the negative electrode (anode) carbon material form. FIG. 1 also illustrates that the lithium polymer battery cell will continue to charge to a higher voltage than its fully charged 4.0 to 4.5 volts if charging is continued after the lithium polymer battery cell reaches its fully charged 4.0 to 4.5 volts. Charging beyond the fully charged condition produces irreparable damage to the lithium polymer battery cell.

FIG. 2 is a schematic diagram showing a lithium polymer battery charger constructed in accordance with one embodiment of the present invention. The lithium polymer battery cells to be charged are indicated by the reference numerals 13, 15, 17, and 19 in FIG. 2.

FIG. 3 is a schematic view showing a plurality of equal charge point lithium polymer battery cells connected in a series stack. Voltage survey means monitor the state of charge of each cell in the stack. FIG. 3 also shows a controlled current source connected to the series stack. The controlled current source is associated with the voltage survey means so that the amount of current supplied from the controlled current source is controlled in response to a control signal supplied from the voltage survey means.

FIG. 4 is a schematic view showing a plurality of lithium polymer battery cells connected in a series stack. Voltage monitors monitor the voltage of each cell in the stack. FIG. 4 also illustrates a relay controlled resistor set associated with the cells for shunting current around individual cells at selected periods of time during the charging of the series stack of lithium polymer battery cells.

FIG. 5 is a schematic view like FIG. 4 but showing another embodiment of the invention.

DETAILED DESCRIPTION OF THE PREFERRED EMBODIMENTS

Lithium polymer battery cells are unforgiving of overcharge.

An overcharged lead acid battery will electrolyze some easily replaced water, and nickel-cadmium or metal-hydride batteries have voltages which stop rising at full charge; but the voltage of the lithium polymer battery cell continues to rise even while being overcharged.

FIG. 1 shows how the voltage of a lithium polymer battery rises quite distinctly at the end of charge.

Thus, as illustrated in FIG. 1, for a lithium polymer battery cell having a fully charged voltage of 4.0 to 4.5 volts, the voltage can rise to a voltage of about 4.7 volts. See the overcharge area peak indicated by the reference numeral 11 in FIG. 1.

What is unique in the lithium polymer battery cell art is that lithium polymer battery cells won't stand such overcharging. The overcharging must be avoided. Overcharging damages the battery seriously. There is no liquid to vaporize (as there is in a lead acid battery, for example). Lithium polymer batteries work on the idea that lithium ions are embedded in a solid polymer. The lithium polymer battery cell is a solid battery. Overcharging can be visualized as depleting all of the lithium ions off of the plate. Breaking connection by overcharging results in a condition in which there is no way to re-establish the connection.

It is essential to avoid overcharging of a lithium polymer battery cell.

The lithium polymer battery charger methods and apparatus of the present invention, as will be described in more detail below with reference to FIGS. 2–4, prevent overcharging of any cell, whether the cells are arranged in a series stack or are arranged in parallel.

FIG. 2 is a schematic diagram illustrating a lithium polymer battery charger 10 constructed in accordance with one embodiment of the present invention.

In FIG. 2 the lithium polymer battery cells to be charged are indicated by the reference numerals 13, 15, 17, and 19.

Each cell is to be charged from a voltage as low as the 2.0 totally discharged voltage to the fully charged voltage as high as 4.5 volts.

The power supply for supplying the charged current is a transformer T1 having a single primary and having two matched secondary windings. The first secondary winding is associated with diodes D1, D2 and D3. The second secondary winding is associated with diodes D4, D5, and D6.

While only two matched secondary windings have been illustrated in FIG. 2, it should be noted that additional matched secondary windings could be incorporated in the charger shown in FIG. 2 for charging additional lithium polymer battery cells.

As will also become more apparent from the description to follow, a single lithium polymer battery cell could be associated with a single secondary winding, rather than having two cells connected in series with each secondary winding as illustrated in FIG. 2; and, in that event, monitoring circuitry for monitoring the charge voltage of the lithium polymer battery cells could be eliminated.

By way of further introductory comments with respect to FIG. 2, it should also be noted that more than two lithium polymer battery cells could be associated with each secondary winding.

In the specific embodiment 10 shown in FIG. 2 the transformer T1 serves as a constant current power supply.

The output voltage sampler and comparator 23 and the pulse width modulator 21 are effective to control operation of the transformer T1 so that each of the secondary windings functions as a constant current power supply for the cells associated with a particular secondary winding.

In the embodiment 10 shown in FIG. 2, each secondary winding has two cells connected in a series stack. For example, cells 13 and 15 are connected in a series stack to the lower secondary winding, and cells 17 and 19 are connected in a series stack to the upper secondary winding.

In the embodiment 10 shown in FIG. 2, the state of charge of each cell is monitored so that the battery charger 10 detects when the state of charge in any cell is approaching full charge.

The charge current to each cell is controlled in response to the detection of the state of charge of each cell to prevent overcharging of any cell.

In FIG. 2 the battery charger 10 starts shunting current around a cell when the voltage across that cell gets up to a certain point.

Operationally, the battery charger 10 shown in FIG. 2 trickle charges a particular cell after the voltage across the cell gets up to a selected point, as will now be described in more detail below.

In the battery charger embodiment 10 shown in FIG. 2, the cell 17 is generating a voltage V11 with respect to the Grnd2. A voltage regulator VR11 is putting out a 2.4 volts reference. A resister divider takes the voltage V11 which is the voltage across the cell 17. This resister divider is set up so that its center tap is at 2.4 volts, the output of the voltage regulator VR11, when the cell is fully charged. The OpAmp U11 thus has a positive terminal reference which is the 2.4 volts exactly. The voltage at the negative terminal of the OpAmp U11, representing the output of the resister divider, slowly rises up as the cell 17 takes the charge. When the cell voltage gets high enough, the output of the OpAmp U11 goes in the negative direction. This turns on the power transistor Q11 to shunt current from V11 around that cell 17 and back to Grnd2. So, as the voltage across the cell 17 gets up to a certain point, the transistor Q11 starts shunting charge current aside. This operationally reduces the charge current in the cell 17. The battery charger 10 thereafter holds the cell 17 at constant voltage, and the charge current that the cell 17 does not absorb goes through the shunting device Q11. The capacitor C11 is useful to limit the frequency response of the electronics so that the electronics do not oscillate.

In this instance the information that one cell has gotten to full charge is used to reduce the charge current that individual cell receives. However, as will be pointed in more detail below, that information could also be used to reduce the charge current received by the entire series stack.

As another alternative, that information can be used to totally discontinue the charging of the entire series stack.

In the battery charger 10 shown in FIG. 2 the charge of each cell is monitored. The charge current to that particular cell is controlled in response to the information obtained by the monitoring to prevent overcharging of that cell.

The charge on the cell 19 is controlled operationally by the OpAmp U12 and its resister divider working off of the voltage regulator V12. The OpAmp U12 turns on the power transistor Q12 when the voltage across the cell 19 sets up to a certain selected point, all in the same way as described in detail above with reference to the corresponding components for the cell 17.

In like manner transistor Q1 operates to shunt current aside from cell 13, and transistor Q2 operates to shunt current aside from cell 15 at the proper points in the charge operation.

This cell voltage monitoring and shunting circuitry can be stacked up indefinitely for any number of lithium polymer battery cells.

Also, any number of matched secondary windings can be utilized.

It should be noted that the presently available electronics have limited voltage capability, in the sense that the best available OpAmps like those used for U11, U12, etc., need more than 2.5 volts to work on. The charger 10 shown in FIG. 2 therefore includes an OpAmp U13 set up as an oscillator to do a charge pump operation through the capacitors C 14 and the diode 11 and the diode 12 so that the voltage of V13 is usefully higher than any voltage in the cells 17 and 19 to provide operational bias voltages for the electronics. If OpAmps could be obtained which would work down reliably at 2.5 volts, then the charge pump operation would not be necessary. The charge pump components described immediately above are auxiliary electronic equipment.

In the charger 10 shown in FIG. 2 two cells are connected in a series stack for receiving the power supply from a related secondary winding of the transformer.

As noted above, more than two cells could be connected in the series stack with each cell instrumented for monitoring the state of charge in each cell.

The most practical number of cells in a stack will depend, to a certain extent, on the obtaining of statistical data regarding manufacturing techniques and relative voltage characteristics for stacks of lithium polymer battery cells as this particular lithium polymer battery art develops further.

It should also be noted that only a single cell can be connected to a related secondary winding, and, in that construction, the individual cell voltage monitoring electronics can be -eliminated. The secondary windings can be sufficiently matched and the related rectifying electronics have sufficiently small tolerances so that the maximum output charging voltage of a secondary winding will equal the full charge voltage of the cell. Thus, in operation, a battery charger which has a 1 to 1 relationship between a secondary winding and a lithium polymer battery cell will bring the cell to full charge without any possibility of overcharge.

The pulse width modulator 21 as described above operates to provide a constant charge current until the monitored secondary reaches a final voltage. The particular circuitry shown in FIG. 2 uses a commercially available chip to pulse width modulate the signals to the power resistors Q1 and Q2 which drive the transformer T1.

The circuit shown in FIG. 2 can have a control system whereby the voltage control Vctl of the pulse width modulator chip 21 is used to control the current. A pulse width modulation of the power transistors Q1 and Q2 in that event would result in control of the voltage being applied to the cells and would thus control the current to whatever amount of current would be desired, rather than providing only a constant charge current (as produced by the specific circuit shown in FIG. 2).

A controlled current power source embodiment of the present invention is shown in FIG. 3 and is indicated generally by the reference numeral 30 in FIG. 3.

The charger 30 shown in FIG. 3 permits control of the charge current and permits tapering the charge current down to some lower level at a certain point in the charge operation, rather than maintaining a constant current output from the power supply 35 during the entire charge operation.

Being able to reduce the charge current, particularly near the end of the charge cycle, minimizes the amount of power which is shunted around individual cells and thereby minimizes the amount of heat which has to be dissipated as a result of such shunting.

As illustrated in FIG. 3 the lithium power battery charger 30 comprises a plurality of lithium polymer battery cells 13, 15, 17, and 19 connected in a series stack and includes voltage survey means 31 for monitoring the state of charge of each cell in the stack. An output detector 33 determines the maximum voltage of any cell in the stack and transmits a signal corresponding to the maximum voltage to the controlled current source 35 by a signal line 37.

When the maximum voltage of any cell in the stack approaches full charge, the signal on the line 37 controls the current source 35 to reduce the amount of current supplied to the series stack of cells.

The charge current may be reduced to a point where the charge current is completely cut off, or, preferably, the charge current is reduced to a trickle charge at a level which will not overcharge the cell having the maximum voltage but which will continue to charge the cells which have voltages less than the full charge voltage.

The implementation of the control current source 35 can be a variable transformer having a motor driven shaft with the motor driven in response to the signal transmitted on the line 37.

The control current source can also be a pulse width modulated transformer of the kind shown in FIG. 2 but having the pulse width modulation set up to control the current going into the transformer rather than a voltage.

Another embodiment of a battery charger for lithium polymer battery cells and constructed in accordance with the present invention is shown in FIG. 4 and is indicated generally by the reference numeral 40. The charger 40 provides selective charge control.

It should be noted that the charger 40 also allows for selective discharge control, during operational usage of the battery, to have all cells reach peak charge at the same time during subsequent charging.

The charger 40 shown in FIG. 4 includes voltage monitors having taps 41–51 for monitoring the voltage of each cell in the stack.

The charger 40 also includes relays 53–61 for controlling the connection of resistors 63–71 across the respective cells 13–20.

The resistors 63–71 serve as capacity adjustment loads.

The charger 40 thus comprises a charge balancing circuit. As all cells become balanced, the cells rotate through the charge routine, as will be described in more detail below.

The charger 40 shown in FIG. 4 employs the relay controlled resistor set associated with the cells for shunting current around individual cells at selected periods of time during the charging of the series stack of lithium polymer battery cells.

The charger 40 shown in FIG. 4 is particularly useful for charging a series stack of cells when the charging history of each cell is known so that the charge current to each cell can be varied during charging of the stack in dependence on the charging history (as well as in response to detection that the state of charge of an individual cell is approaching full charge).

In the operation of the battery charger 40 shown in FIG. 4, it is not necessary to wait until a particular cell approaches full charge before shunting at least some of the charging current around that particular cell.

Instead, a fixed, arbitrary amount of charge current can be pulled away from any particular cell at any particular time by engaging the relay for that particular cell and by maintaining the relay engaged for the desired amount of time.

By controlling the net charge to each cell during the charging operation, it is possible to make all cells reach peak voltage at the same time and to therefore avoid the problem of dissipating the large amounts of power which can be required to shunt current around substantially all of the cells during a time interval near the end of the charging operation.

To illustrate by way of an example, if it is known from the last cycle of charging which cell is going to get charged first, then, using a distinct resistor and relay, a current can be pulled away from that cell at any time.

Thus, if it is known that the charging operation will take about an hour, and if it is known that cell 13 is going to be the first cell to reach full charge, then, after about five minutes into the charge cycle, the relay 53 could be actuated to reduce cell 13's charge through the capacity adjustment load resistor 63, for, say, fifteen minutes.

By way of continued example, if it is known that cell 19 gets to full charge just after cell 13, the relay 59 would be actuated at a selected time after the relay 53, to shunt some of the charge to cell 19 for, say, ten minutes.

The drops in the respective charge currents to the respective cells, resulting from selected actuations of the respective relays for selected periods of time, reduce the charges to the cells by selected amounts during actuations of the respective relays.

The relay actuated shunts shown in the FIG. 4 embodiment are digital devices which shunt an arbitrary, fixed amount of current. This can have some advantages over a shunt regulator (of the kind described earlier with reference to FIG. 2) which is a linear device (a device in which the current through the shunt varies).

By proper control of the net charge to all cells, it is possible to cause all of the cells to reach peak voltage at the same time. This avoids the shunting of peak currents and peak power at the end of the charging cycle. It avoids the need to dissipate the heat from such shunted peak power at the end portion of the charging cycle.

A sample algorithm for determining the operation of the relays 53–61 is set out at the bottom part of FIG. 4 and is repeated immediately below in this specification. Sample Algorithm:

CALCULATE: EOC+EOD FOR EACH CELL
2
FIND CELL WITH HIGHEST CALCULATED VALUE
IF HIGHEST CELL ALSO HAS LOWEST EOD, DO NOTHING
ELSE, APPLY LOAD TO HIGHEST CELL FOR A PREDETERMINED NUMBER OF MINUTES DURING NEXT CHARGE PERIOD

This algorithm, when incorporated in computer software, enables the most desired mode of operation of the relays 53–61 to be continuously refined during repeated cycles of recharging of the series stack of lithium polymer battery cells 13–20.

The charger 40 shown in FIG. 4 enables pre-emptive shunting of the cells to be accomplished. By knowing which cell is going to get to full charge first, it is possible to shunt aside a bit of current to that cell at a convenient time so that cell does not get to the end of charge before the desired time for reaching full charge.

Another embodiment of a charger for lithium polymer cells and constructed in accordance with the present invention is shown in FIG. 5 and is indicated generally by the reference numeral 50.

The charge 50 includes voltage monitors having taps 41–51 for monitoring the voltage of each cell in the stack.

The charge 50 also includes single pole, double throw switches 53–57 for controlling the connections between the several cells 13–17 in the nominally series string. The term cells is to be interpreted literally as a cell or figuratively as a group of cells or batteries in some series/parallel combination, as might be found in electrical land vehicles or electrical by powered water vehicles.

The charger 50 (in the specific embodiment illustrated in FIG. 5) thus switches cells completely out of the charge current path, substantially without power dissipation, whenever desirable as indicated by the measurements made from the voltage monitors. This removal from the charge path may be done at end of charge or pre-emptively during the charging process so that all cells reach full charge at substantially the same time.

Alternatively, the switching circuit may shunt a large fraction of the charging current to such a cell or battery such that the cell or battery is trickle charged at such a low rate as not to exceed the cutoff voltage.

While we have illustrated and described the preferred embodiments of our invention, it is to be understood that these a re capable of variation and modification, and we therefore do not wish to be limited to the precise details set forth, but desire to avail ourselves of such changes and alterations as fall within the purview of the following claims.

We claim:

1. A lithium polymer battery charger apparatus for charging a plurality of equal charge point lithium polymer battery cells to fully charged conditions without overcharging the cells, said apparatus comprising, a plurality of equal charge point lithium polymer battery cells, each of the lithium polymer battery cells having a fully charged condition and being susceptible to serious damage in the event of overcharging beyond said fully charged condition, a transformer having one primary winding and a plurality of equally matched secondary windings, each of the secondary windings connected to at least one lithium polymer battery cell, control means for controlling the voltage on the primary winding to produce a voltage in each secondary winding which is effective to charge each lithium power battery cell and to bring each lithium polymer battery cell to said fully charged condition without overcharging, charge terminating means for discontinuing the charging when all of the cells have been fully charged, and wherein only one lithium polymer battery cell is connected to a secondary winding and wherein the control means limit the maximum voltage on the primary winding to that which will produce a voltage on each secondary winding corresponding to the voltages needed to bring the lithium polymer cells to said fully charged condition.

2. A lithium polymer charger apparatus for charging a plurality of equal charge point lithium polymer battery cells, said apparatus comprising, a plurality of equal charge point lithium polymer battery cells, each of the lithium polymer battery cells having a fully charged condition, a transformer having one primary winding and a plurality of equally matched secondary windings, each of the secondary windings connected to at least one lithium polymer battery cell, control means for controlling the voltage on the primary winding to produce a voltage in each secondary winding which is effective to charge each lithium polymer battery cell and to bring each lithium polymer battery cell to said fully charged condition, charge terminating means for discontinuing the charging when all of the cells have been fully charged, and wherein multiple lithium polymer battery cells are connected in series with a secondary winding and including detecting means for detecting when a particular lithium polymer battery cell is nearing full charge and wherein, in response to the detecting means detecting that a particular lithium polymer battery cell is nearing full charge, the control means shunt sufficient current around that cell to avoid overcharging that cell and continue the shunting until all of the cells have been fully charged.

3. The apparatus defined in claim 2 wherein the control means include transistor means for doing the shunting in an analog transition in which the amount of shunted current is increased as the cell gets nearer to said fully charged condition.

4. The apparatus defined in claim 3 wherein the control means include relay means for doing the shunting in a digital transition in which a relay is energized to shunt a fixed amount of current when the cell reaches the fully charged condition.

* * * * *